J. L. ANDERSON.
TORCH ADJUSTER.
APPLICATION FILED SEPT. 3, 1919.
1,371,540.
Patented Mar. 15, 1921.
5 SHEETS—SHEET 1.
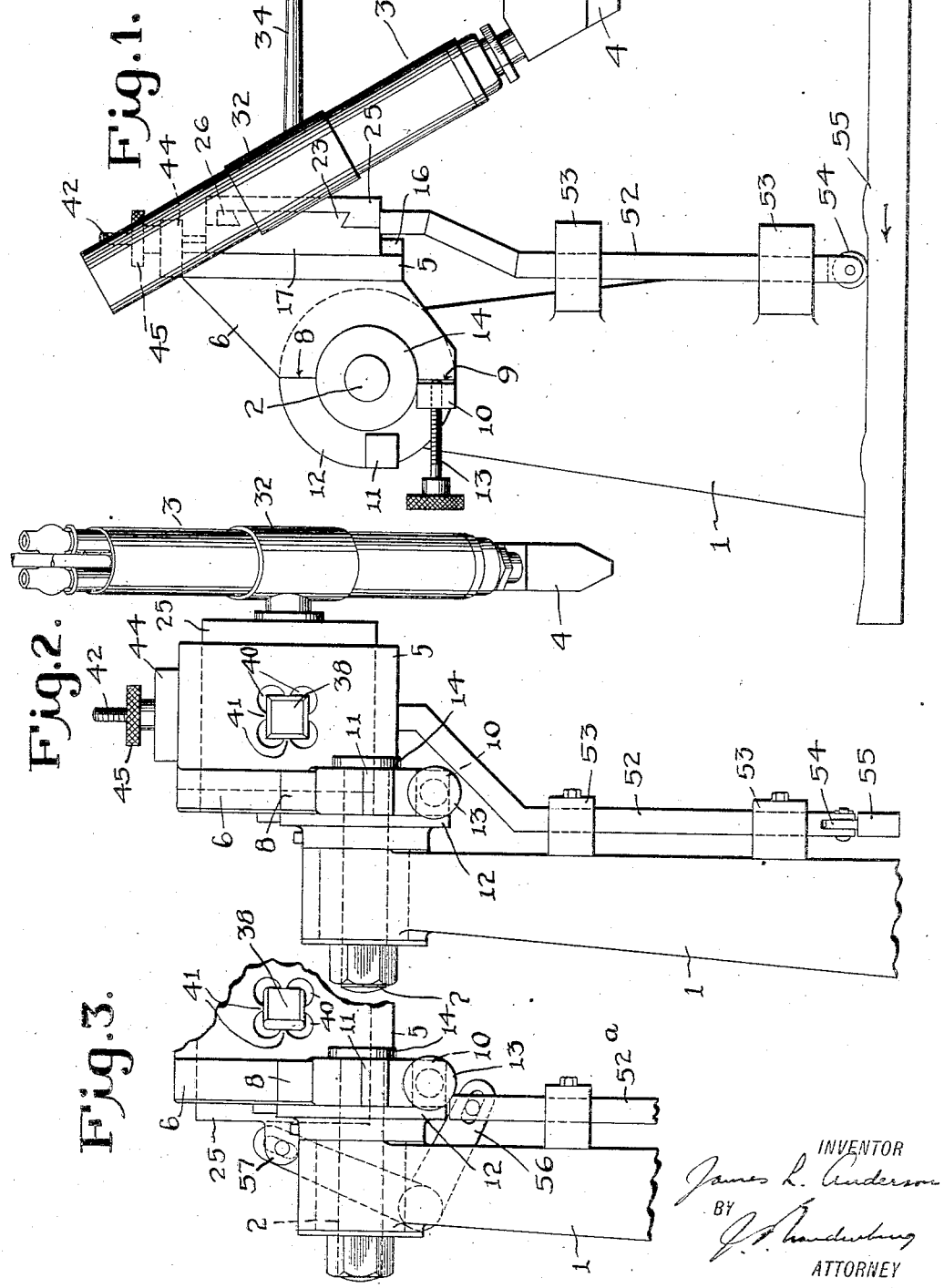
INVENTOR
James L. Anderson
BY
ATTORNEY

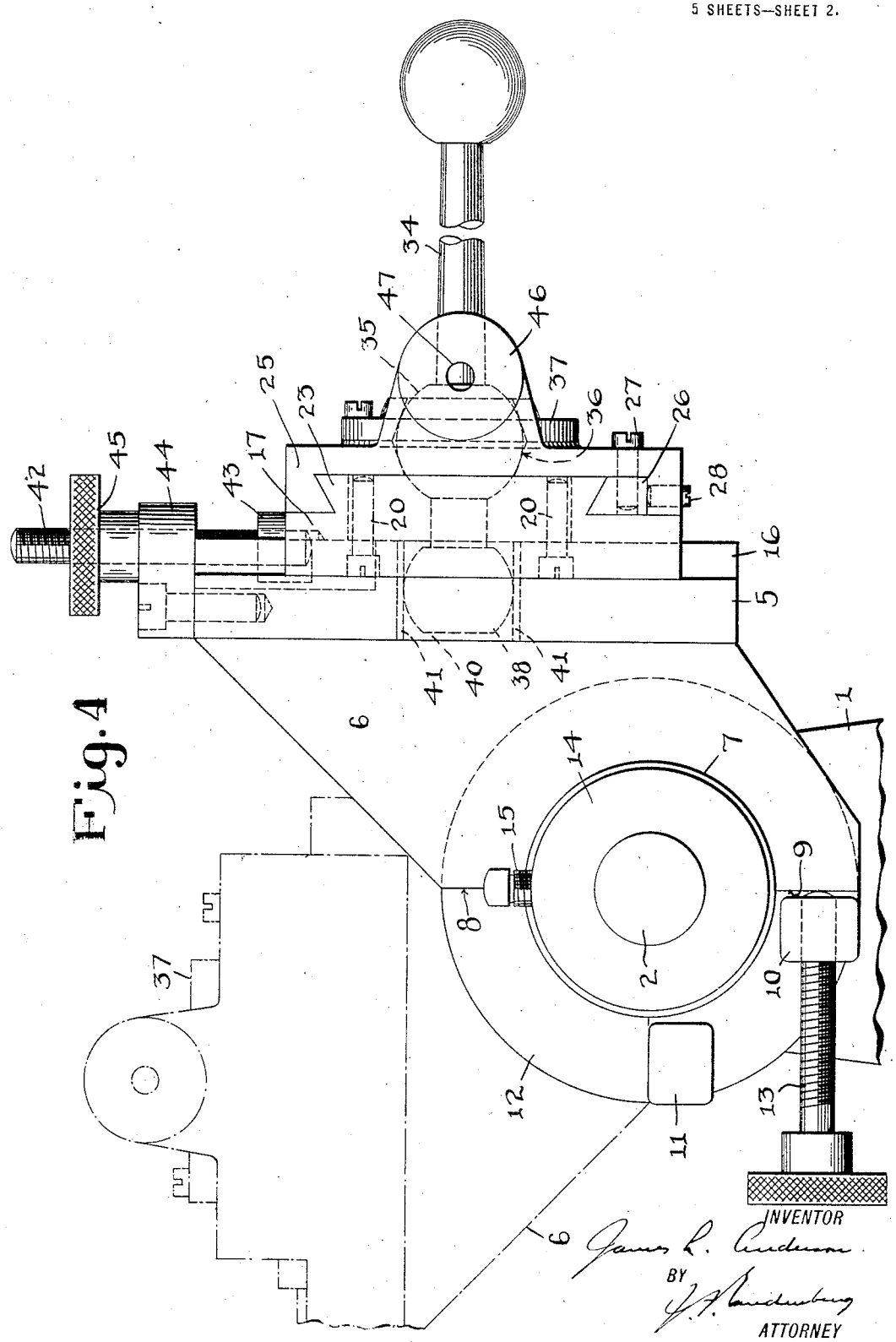

J. L. ANDERSON.
TORCH ADJUSTER.
APPLICATION FILED SEPT. 3, 1919.
1,371,540.
Patented Mar. 15, 1921.
5 SHEETS—SHEET 3.
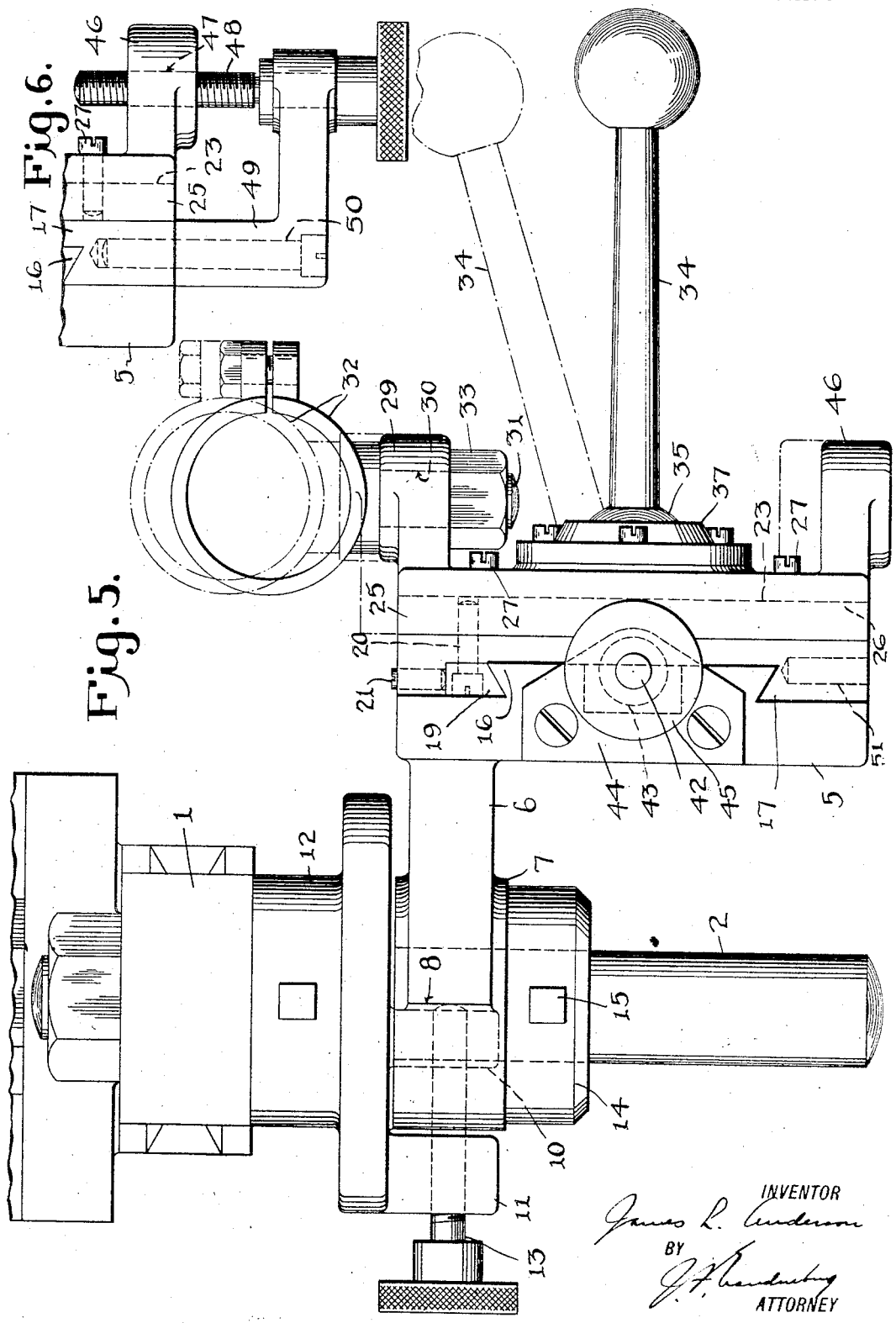

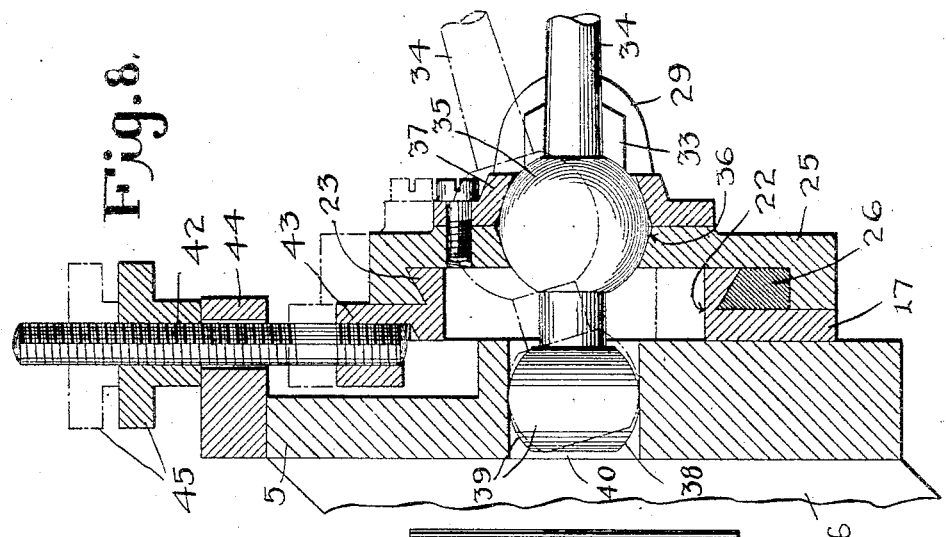

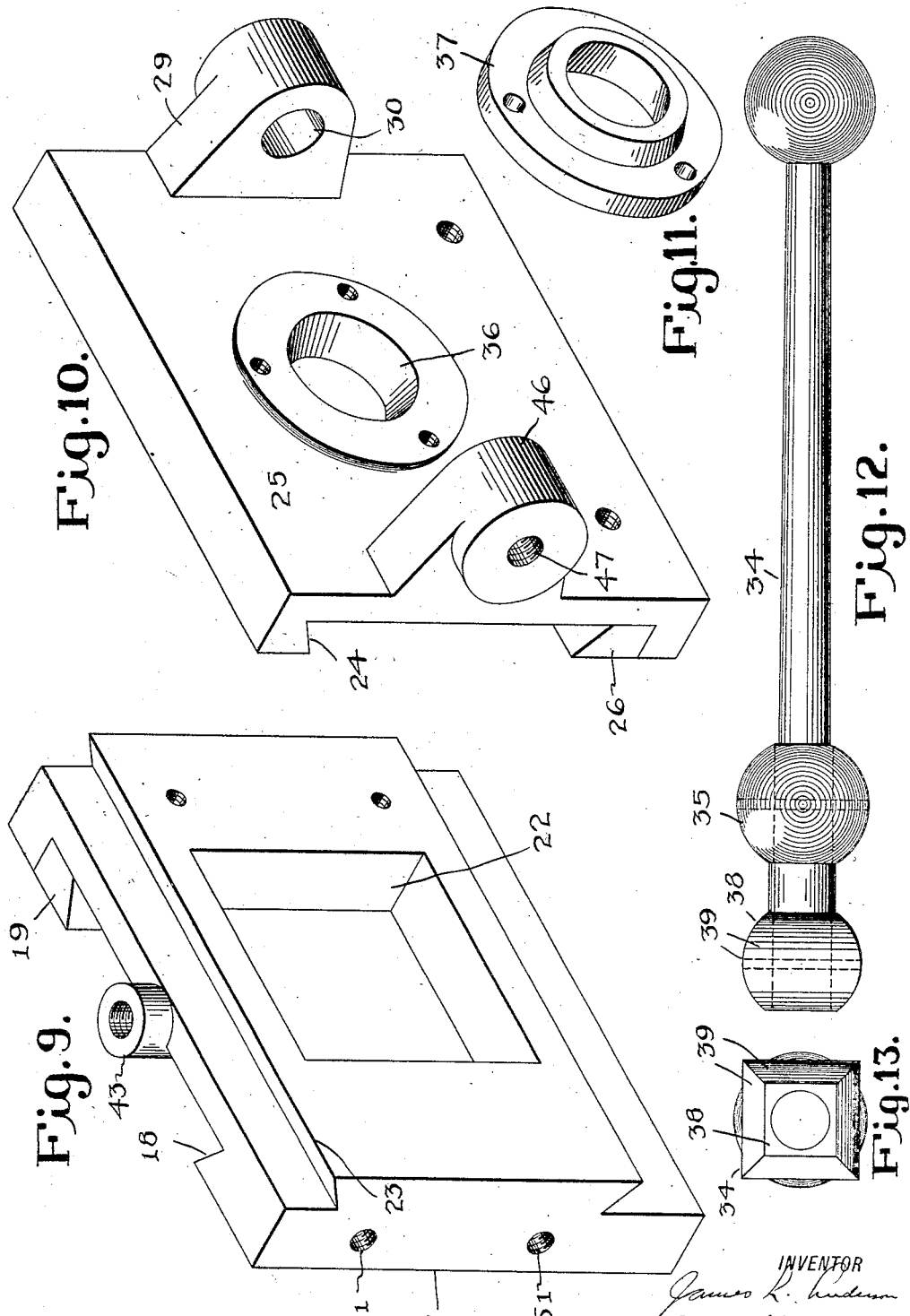
J. L. ANDERSON.
TORCH ADJUSTER.
APPLICATION FILED SEPT. 3, 1919.
1,371,540.
Patented Mar. 15, 1921.
5 SHEETS—SHEET 5.

UNITED STATES PATENT OFFICE.

JAMES L. ANDERSON, OF BAYONNE, NEW JERSEY, ASSIGNOR TO DAVIS-BOURNON-VILLE COMPANY, OF NEW YORK, N. Y., A CORPORATION OF NEW YORK.

TORCH-ADJUSTER.

1,371,540.      Specification of Letters Patent.      Patented Mar. 15, 1921.

Application filed September 3, 1919. Serial No. 321,301.

*To all whom it may concern:*

Be it known that I, JAMES L. ANDERSON, a citizen of the United States, and resident of Bayonne, in the county of Hudson and State of New Jersey, have invented a new and useful Torch-Adjuster, of which the following is a specification.

The invention relates more particularly to apparatus for autogenous or fusion welding. In machines for welding tubing and other longitudinal seams in which the work or torch is driven at even speed over or beneath a mechanically supported torch or welder or jig holding the work, it is important to provide means of adjustment during welding whereby the welder can be caused to follow lateral deviations of the seam, and also to provide for the torch being raised toward the end of the seam, or in some cases for raising and lowering it at intermediate regions where the rate of heat conduction may vary due to differences in the amount of metal, or in order to follow an undulating seam. The object of the invention is specifically to provide a simple and compact universal torch shifter for these purposes, whereby the torch can be moved up and down and laterally or in any combinations of these movements with ease and certainty by a single lever or handle. The appliance comprises a bracket having successive slides movable horizontally and vertically, one upon a guide on the support and the other upon a guide on the first slide, and a lever having universal fulcrum-bearing on the support and universal rocking bearing on the second or outer slide, which carries the torch in a suitable holder, all as hereinafter more fully set forth.

In the accompanying drawings:

Figure 1 is a side elevation, illustrating in addition to the main part of the invention how an automatic control may be used in connection with the device;

Fig. 2 is a rear elevation;

Fig. 3 is a fragmentary rear elevation, indicating another form of automatic control;

Fig. 4 is a side elevation on a larger scale of the adjuster head, with the torch omitted, dotted lines showing the head thrown back;

Fig. 5 is a plan view of Fig. 4, broken lines being used to show a shifted position;

Fig. 6 is a fragmentary plan showing an attachment which may be used;

Fig. 7 is a front elevation of the adjuster head;

Fig. 8 is a central vertical section, showing a shifted position in broken lines;

Fig. 9 is a perspective view of the first slide;

Fig. 10 is a similar view of the second slide;

Fig. 11 is a perspective view of a cap plate forming part of a ball socket;

Fig. 12 is a side elevation or plan of the lever; and

Fig. 13 is a rear end view thereof.

The adjuster head is shown mounted on a standard or upwardly extending arm 1, at the upper end of which is a fixed horizontal shaft 2. 3 is the welder, more especially an oxy-acetylene torch having a tip 4 which delivers a flame or series of jets extended lengthwise of the seam to be welded. The tubing or other metal to be welded is driven at even, adjustable speed beneath the torch by mechanism not necessary to illustrate, as it forms no part of the invention.

The adjuster head includes a support member 5 consisting of a flat upright rectangular block having a rearwardly projecting flange 6, terminating in a hub 7, which is rotatable on the shaft 2. Abutment shoulders 8, 9 are formed on said flange to coact with stops 10, 11 on a fixed flange 12. Of these, the shoulder 8 and stop 10 are disposed to sustain the adjusted head against downward swinging about the pivot shaft at a desired working position. This stop is rendered adjustable by a screw 13. The other shoulder 9 and the stop 11 are arranged to sustain the head and torch as on a rest when they are thrown up and back to an inoperative, out of the way position, suggested by broken lines in Fig. 4. The hub 7 is confined against endwise movement on the shaft by the flange 12 and a collar 14 held by a set-screw 15.

On the front face of the support member 5 is a vertical dove-tail projecting guide 16. 17 is a slide consisting of a plate having a dove-tail slide recess 18 on its back to engage said guide, one side of said recess being formed by a gib 19 held by screws 20 and pressed by set-screws 21. The interior of this slide or carriage is cut away, forming a large opening 22.

The first slide has a similar guide 23 on its face, engaged by a similar recess 24 in the back of a second slide 25, having a gib 26 with screws 27, 28. The guide 23 is at right angles to the guide 16, that is to say, in this instance, horizontal.

The second or outer slide 23 has a forwardly projecting lug 29 at one side, containing a horizontal transverse hole 30. Said hole receives a horizontally projecting stem 31 on a torch-holder collar 32, said stem being secured by a nut 33, which permits the holder and torch to be disposed at any angle desired in the vertical longitudinal plane.

The compound slides are moved up and down and laterally by a forwardly projecting hand lever 34, which extends through the interior opening of the first slide 17 and has a universal fulcrum bearing in the support behind and a universal rocking bearing in the front slide 25, whereby movement is imparted to one or other or both slides, according to the manner in which the handle is tilted. In the preferred embodiment, the lever is provided at its rear portion with two enlargements of ball-like character. In the illustrated embodiment, spherical enlargement 35 is secured to the lever at a short distance from its rear end, to work in a ball socket on the slide 25, wherein the ball is confined. Said socket may be formed by a tapered hole 36 in the body of the slide and a reversely tapered hole in a screw-on cap 37. The enlargement 38, at the rear end of the lever, instead of being a true ball, is square with cylindrically curved sides 39, opposite sides having the same radius of curvature. This enlargement is adapted to rock in any direction and also to slide, but not to turn about the longitudinal axis, in a straight, virtually square socket 40 in the support 5. This socket is conveniently formed by four intersecting drill openings having the apices 41 at their intersections flattened to form bearing ribs touching the sides of the enlargement and of sufficient length to permit the desired rocking.

A vertical screw 42 is secured at its lower end in a boss 43 on the top of the vertical slide 17, and passes freely through an apertured overhanging bracket 44 on the top of the support 5. A knurled head nut 45 on the screw above said bracket is adapted to be screwed up or down, and thereby adjustably limits the downward movement of the slide and therefore of the torch. The screw and nut are raised with the slide when the latter is shifted upward by the handle; and on descending the nut encounters the bracket, thus stopping the torch at a definite elevation corresponding to a normal working condition, it being understood that exactitude in the vertical distance of the torch tip from the seam is important.

In operation, moving the handle to right or left moves the horizontal slide and correspondingly shifts the torch to one side or the other with reference to the seam. Movement of the handle up or down moves both of the slides together in the vertical direction, raising or lowering the welder. Any other rocking movement of the lever causes both carriages to move on their respective slides and the torch to move in a resulting diagonal direction. In these operations the spherical ball 35 rocks in its socket in the slide 25 and the square ball 39 rocks and slides in the straight socket in the support 5, but this might be reversed. By means of the same handle the whole head and torch can be turned back to the inoperative dotted line position of Fig. 4, where they are sustained by the stop 11.

In some cases, as where the seam travels straight, a fixed or independent adjustment in the horizontal direction may be desired. For such purpose the front or second slide 25 is provided with a forwardly projecting lug 46 at the side opposite from the torch-holder lug 29. Such lug 46 has a horizontal screw-threaded opening 47, which is engaged by a screw 48, journaled and held against longitudinal movement in a bracket 49, which can be attached to the slide 17 by screws 50 engaging screw-holes 51. With this attachment in place the adjuster head is locked against lateral shifting by the handle 34, such adjustment, if needed, being effected by turning the screw. Vertical movability under the control of the handle, however, is not affected.

Figs. 1 and 2 illustrate the fact that an automatic vertical control can be used in connection with the adjuster head. 52 represents a vertical slide rod movable in guides 53 and arranged to abut at its upper end against the bottom of the slides. The lower end of the rod has a roller 54 acted upon by a longitudinally movable cam 55. This cam may be mounted and driven in the same direction as the work in any suitable manner and be of any desired configuration, to produce a desired automatic raising and lowering of the torch. Fig. 3 indicates an automatic arrangement for producing lateral shifting. Here a cam-operated rod 52$^a$ is connected with the horizontal slide 25 by a bell-crank 56, the said slide being represented as provided with a lug 57 for the purpose.

While the preferred embodiment of the invention has been described in detail, it will be understood that changes may be made without departing from essentials and that other forms and embodiments may be devised.

What I claim as new is:

1. A welding appliance comprising the combination of a support, a guide thereon, a slide movable on said guide and bearing a second guide at right angles to the first, a second slide movable on the second guide, a torch-holder on the second slide, said guides and slides being disposed respectively for movement of the torch-holder up and down and sidewise, and a lever tiltable in any direction to produce corresponding movement of the torch, said lever being universally fulcrumed on the support and having universal bearing upon the second slide.

2. A welding appliance comprising the combination of a support, a guide thereon, a slide movable on said guide and bearing a second guide at right angles to the first, a second slide movable on the second guide, a torch-holder on the second slide, said guides and slides being disposed respectively for movement of the torch-holder up and down and sidewise, a lever universally fulcrumed on the support and having universal bearing upon the second slide, and an adjustable stop for limiting the downward movement of the vertically movable carriage, whereby the torch is restored to a desired variable distance from the work.

3. A welding appliance comprising the combination of a support, a guide thereon, a slide movable on said guide and bearing a second guide at right angles to the first, a second slide movable on the second guide, a torch-holder on the second slide, said guides and slides being disposed respectively for movement of the torch-holder up and down and sidewise, and a lever universally fulcrumed on the support and having universal bearing upon the second slide, in combination with a tiltable mounting and rest for said support whereby the whole adjuster with the torch can be thrown back.

4. A welding appliance comprising the combination of a support, a guide thereon, a slide movable on said guide and bearing a second guide at right angles to the first, a second slide movable on the second guide, a torch-holder on the second slide, said guides and slides being disposed respectively for movement of the torch-holder up and down and sidewise, and a lever tiltable in any direction to produce corresponding movement of the torch, said lever being universally fulcrumed on the support and having universal bearing upon the second slide, in combination with a tiltable mounting for said support whereby the whole adjuster with the torch can be thrown back, a normal stop sustaining the support in the working condition, and a rest stop arranged to sustain the support and the parts carried thereby when thrown back.

5. A welding appliance comprising the combination of a support, a guide thereon, a slide movable on said guide and bearing a second guide at right angles to the first, a second slide movable on the second guide, a torch-holder on the second slide, said guides and slides being disposed respectively for movement of the torch-holder up and down and sidewise, and a lever having a universal fulcrum bearing on the support and a universal bearing on the second carriage, one of said bearings being slidable.

6. A welding appliance comprising the combination of a support, a guide thereon, a slide movable on said guide and bearing a second guide at right angles to the first, a second slide movable on the second guide, a torch-holder on the second slide, said guides and slides being disposed respectively for movement of the torch-holder up and down and sidewise, and a lever having a universal fulcrum bearing on the support and a universal bearing on the second carriage, one of said bearings being slidable, said slidable bearing comprising a rounded enlargement and a straight socket in which said enlargement can rock in any direction and also slide.

7. A welding appliance comprising the combination of a support, a guide thereon, a carriage movable on the guide, said carriage having an interior opening and bearing a second guide at right angles to the first, a second slide movable on the second guide, a torch-holder on the second slide, said guides and slides being disposed respectively for movement of the torch-holder up and down and sidewise, and a lever passing through the interior opening of the first slide and having a universal bearing on the second slide and a universal fulcrum on the support.

8. A welding appliance comprising the combination of a support, a guide thereon, a slide movable on said guide and bearing a second guide at right angles to the first, a second slide movable on the second guide, a torch-holder on the second slide, said guides and slides being disposed respectively for movement of the torch-holder up and down and sidewise, and a lever having two rounded enlargements whereby it has universal bearings upon the second slide and upon the support with capacity for sliding in one of them.

9. The combination of a guide, a slide movable thereon and bearing a second guide at right angles to the first, a second slide movable on the second guide, a torch on the second slide, and a lever having a universal fulcrum and a universal bearing on the torch slide.

10. An adjusting bracket comprising a support bearing a guide, a slide movable on said guide, said slide having an interior opening and bearing a second guide at right angles to the first, a second slide movable on the second guide, said guides and slides being disposed for movement up and down and horizontally respectively, and a lever extending through the interior opening of the first slide and having a universal fulcrum on the support behind and a universal bearing in the second or outer slide.

11. An adjusting bracket, comprising a support bearing a guide, a slide movable on said guide, said slide having an interior opening and bearing a guide at right angles to the first, a second slide movable on the second guide, said guides and slides being disposed for movement up and down and horizontally respectively, and a lever extending through the interior opening of the first slide and having a ball enlargement and a square enlargement with cylindrically curved sides to coöperate with the support and the second slide, one of said parts having a ball socket for the ball and the other a straight socket in which the square enlargement can slide as well as rock in any direction.

12. The combination of a support, a primary guide, a primary slide movable thereon and bearing a secondary guide at right angles to the primary guide, and a lever having a universal fulcrum-bearing on the support and a universal bearing on the secondary slide, one of said bearings comprising a square body having cylindrically curved sides and a straight socket containing said square body with capacity for relative sliding movement, as well as relative rocking movement in any direction.

JAMES L. ANDERSON.